Feb. 18, 1969 W. J. WYLUPEK 3,428,079
FLOW MEASUREMENT AND CONTROL SYSTEMS
Filed Feb. 2, 1966
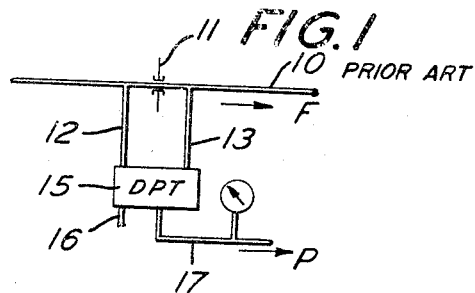
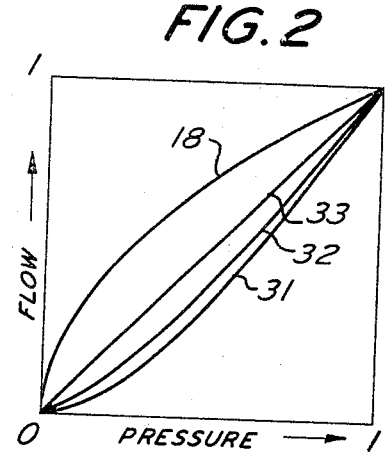
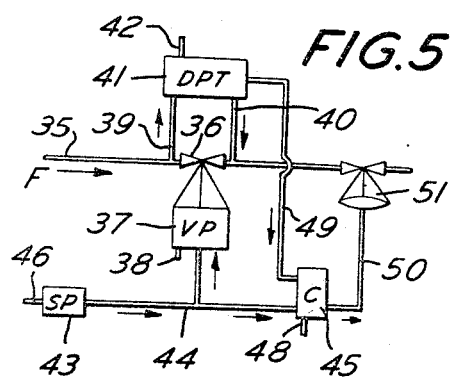
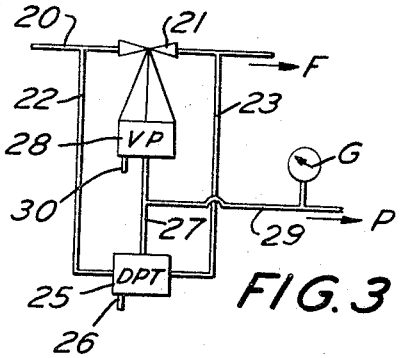
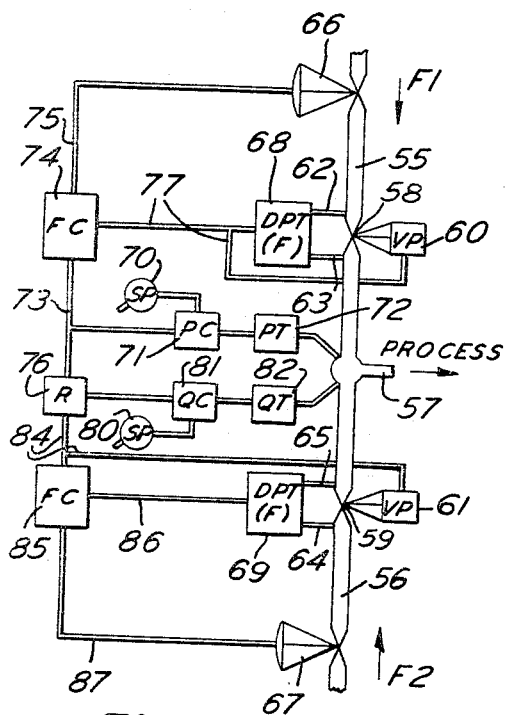
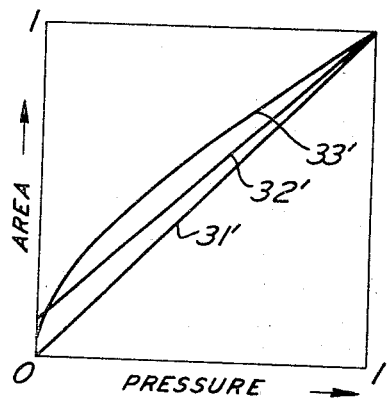
INVENTOR.
WILLIAM J. WYLUPEK
BY
ATTORNEY

United States Patent Office 3,428,079
Patented Feb. 18, 1969

3,428,079
FLOW MEASUREMENT AND CONTROL SYSTEMS
William J. Wylupek, Pennsauken, N.J., assignor to Moore Products Co., Spring House, Pa., a corporation of Pennsylvania
Filed Feb. 2, 1966, Ser. No. 524,442
U.S. Cl. 137—486
Int. Cl. G05d 7/06
13 Claims

ABSTRACT OF THE DISCLOSURE

Flow measurement and control systems in which the flow is measured as a function of the pressure differential across a variable orifice and means is provided for increasing the size of the orifice for increasing values of the flow to obtain a more nearly straight line relationship between flow and differential pressure than would be obtained with a fixed size of orifice, the variable orifice being a motor operated valve, and a differential pressure responsive transducer providing an output signal for the motor operated valve.

---

This invention relates to improvements in flow measurement and flow control systems and more particularly to such systems requiring a high rangeability.

The flow in a pipe line is usually measured by the pressure drop across an orifice in the pipe line. The differential pressure applied in a differential pressure transmitter develops an output signal which is proportional to the differential pressure. Since the area of the orifice is a constant the flow F is proportional to the square root of the differential pressure.

It is the principal object of the present invention to provide, in a flow line, measuring and/or control apparatus which has a high rangeability.

It is a further object of the present invention to provide in a fluid flow line, measuring and/or control apparatus in which an output condition, such as a pressure, is available in a more advantageous range of operating conditions than has heretofore been available.

It is a further object of the present invention to provide, in a fluid flow line, measuring and/or control apparatus having a variable measuring orifice with provisions for varying the size of the orifice in predetermined relation to the differential pressure developed across the orifice.

It is a further object of the present invention to provide, in a fluid flow line control apparatus responsive to the differential pressure across a variable orifice for providing a signal for varying the size of the orifice in predetermined relation to the differential pressure and for varying the flow through the flow line.

It is a further object of the present invention to provide, in a fluid flow line supplied with fluid from a plurality of sources a predetermined proportioning of the supplied fluids over a wide range.

Other objects and advantageous features will be apparent from the description and claims.

The nature and characteristic features of the invention will be more readily understood from the following description taken in connection with the accompanying drawings forming part thereof, in which:

FIG. 1 is a diagrammatic view of a fluid flow line with a fixed orifice and a conventional differential pressure transmitter connected across the orifice;

FIG. 2 is a comparative graph showing the flow-signal pressure relation for the system of FIG. 1 and for systems in accordance with the present invention;

FIG. 3 is a diagrammatic view of a measuring system in accordance with the invention;

FIG. 4 is a graph showing the orifice-signal pressure relation with different orifice opening characteristics in the system of FIG. 3;

FIG. 5 is a diagrammatic view of a flow control system in accordance with the invention; and FIG. 6 is a diagrammatic view of a proportioning flow control system in accordance with the invention and wherein the set point is automatically controlled.

It should, of course, be understood that the description and drawings herein are illustrative merely, and that various modifications and changes can be made in the structure disclosed without departing from the spirit of the invention.

Referring now more particularly to FIG. 1 of the drawings, a pipe line 10 is shown connected to any suitable source of fluid (not shown) and having a fixed orifice 11 therein with pressure taps 12 and 13 across the orifice 11. The taps 12 and 13 are connected to a differential pressure transmitter 15. The differential pressure transmitter 15 can be of any desired type such as that shown in U.S. Patent No. 2,312,201 to C. H. Thompson and C. B. Moore. The differential transmitter 15 has a supply fluid connection 16 thereto from a source of fluid pressure and a signal transmitting connection 17 for transmission of a signal determined by the differential pressure in the taps 12 and 13.

Since the area of the orifice 11 is a constant in this system:

$$Q \approx \sqrt{P}$$

where

Q is the flow, and
P is the output pressure in the connection 17.

In FIG. 2, in which flow is represented as ordinates and signal pressures as abscissas, the flow-transmitted or signal pressure curve for the system of FIG. 1 is shown as the curve 18. It will be noted that for flow values of less than about 20% of maximum the pressure changes are too small to provide useful signals.

In accordance with the present invention, and as shown in FIG. 3, the pipe line 20 which is connected to any suitable source of fluid (not shown) has an adjustable port valve 21 therein which serves as a variable or adjustable orifice, with pressure taps 22 and 23 extending from the pipe line 20 on opposite sides of the valve 21 to a differential pressure transmitter 25. The differential pressure transmitter 25 has a supply fluid connection 26 thereto from a source of fluid pressure and a signal transmitting connection 27 for transmission to fluid pressure or diaphragm controlled valve positioner 28, the signal also being available in a fluid connection 29 for indication, recording and control. For purposes of illustration, a pressure gage G is shown connected to the fluid connection 29.

The valve positioner 28 can be of any desired type, such as that shown in U.S. Patent No. 2,653,578 to C. B. Moore, but is not restricted to that specific structure and can have a supply fluid connection 30.

For a variable orifice the relation of the flow and the transmitted pressure is $$Q \approx A\sqrt{P}$$

where

Q represents flow
A represents an area of opening of valve 21 and
P represents the output pressure of the transmitter 25

But $$A = F(P)$$

So that $$Q \approx \sqrt{P} F(P)$$

where F(P) increases with increasing values of P.

The relationship of the area of valve opening of the valve 21 to the pressure transmitted by the differential pressure transmitter 25 can be selected as desired. Illustrative examples follow and their effects are shown in FIGS. 2 and 4.

In FIG. 4 orifice area or valve openings are plotted as ordinates and transmitted or signal pressure as abscissas.

Case I.—$F(P)=P$, where the area of the valve opening of the valve 21 is directly proportional to the pressure input in the transmission conenction 27 from the differential pressure transmitter 25 and there is no suppression.

Then
$$Q \approx P\sqrt{P}$$
$$\approx P^{3/2}$$

The curves for this are shown in FIG. 2 at 31 and in FIG. 4 at 31'.

Case II.—$F(P)=(1-R)P+R$. The area of the valve opening of the valve 21 is directly proportional to the pressure input but with suppression such that when $P=$zero, valve opening is R. Thus R is the ratio of minimum opening to maximum opening. Considering the valve 21 as an orifice, R is the $\beta$ ratio $\beta_{min}/\beta_{max}$, so that $$Q \approx \sqrt{P}[(1-R)P+R]$$

The curves for this are shown in FIG. 2 at 32 and in FIG. 4 at 32'.

Case III.—The area of the valve opening bears a square root relation to the input pressure, that is $$F(P)=\sqrt{P}$$

Then
$$Q \approx \sqrt{P}\sqrt{P}$$
or
$$Q \approx \sqrt{P}$$

This relation is approached by the empirical curves shown in FIG. 2 at 33 and in FIG. 4 at 33'.

In accordance with the invention, and as shown in FIG. 5, a pipe line 35 is provided connected to any suitable source of fluid, with a variable valve 36 providing a variable orifice serving as a variable impedance, controlled by a valve positioner 37. The valve positioner 37 can have a supply fluid connection 38. Pressure taps 39 and 40 connected to the pipe line 35 on opposite sides of the valve 36 extend to a differential pressure transmitter 41. The pressure transmitter 41 can have a supply fluid connection 42.

A set point pressure source 43 is provided, which may be manually or automatically controlled and which, if manually controlled can be a pressure regulator connected by a fluid connection 44 to the valve positioner 37 and to the set point connection of a pneumatic controller 45.

The set point pressure source 43 can have a supply fluid connection 46.

The pneumatic controller 45 can be of any desired type, such for example that shown in U.S. Patent No. 2,520,468 to C. B. Moore, and can have a supply fluid connection 48. The controller 45 has a variable input connection 49 to which the output of the differential pressure transmitter 41 is connected.

The controller 45 has an output signal connection 50 connected to a motor operated valve 51 in the pipe line 35 for controlling the fluid flow therethrough.

Referring now to FIG. 6 the invention is illustrated in its application to a ratio control or proportioning system.

First and second fluid supply or pipe lines 55 and 56 are connected to a delivery pipe line 57.

The pipe lines 55 and 56 have adjustable valves 58 and 59 controlled by valve positioners 60 and 61 with pressure taps 62 and 63 extending from the pipe line 55 and pressure taps 64 and 65 extending from the pipe line 56 respectively to differential pressure transmitters 68 and 69.

The pipe lines 55 and 56 have motor operated control valves 66 and 67 therein.

One set point pressure source 70 is connected to a pressure controller 71 which has a pressure transmitter 72 connected thereto from the pipe line 57. The pressure controller 71 is connected by a fluid connection 73 to a flow controller 74 from which a signal fluid connection 75 extends to the motor operated control valve 66. The fluid connection 73 also extends to a ratio relay 76.

A fluid connection 77 extends from the differential pressure transmitter 68 to the flow controller 74 and to the valve positioner 60.

Another set point pressure source 80 is connected to a quality controller 81 which has a quality transmitter 82 connected thereto from the pipe line 57. The quality controller 81 is connected by a fluid connection 83 to the ratio relay 76 from which a fluid connection 84 extends to a flow controller 85 and to the valve positioner 61. The differential pressure transmitter 69 is connected to the flow controller 85 by a fluid connection 86, and a signal fluid connection 87 extends from the flow controller 85 to the motor valve 67.

By adjustment of the set point sources 70 and 80, and subject to the control exerted by the ratio relay, the desired proportion can be effected. A wide rangeability is available by the inclusion of the variable valves or orifices 58 and 59, with variation in the size thereof in predetermined relation to the differential developed across these orifices.

It will be noted that as indicated by the curves 32 and 33, and 32' and 33' it is possible to obtain useful differentials and flows in a range of the order of 100 to 1.

I claim:
1. In combination
  a fluid flow line connected to a source of fluid,
  a variable restriction member interposed in said flow line and providing a pressure differential in said flow line,
  means responsive to said pressure differential providing a condition related to said pressure differential,
  means for controlling said restriction member in a predetermined relation to said condition such that the relationship between the differential pressure $p$ and the flow Q in said flow line is defined by the equation
  $Q \approx A\sqrt{P}$, where A is proportional to the effective area of said restriction member and is determined by said condition and has a value which increases with increasing values of $p$,
  said responsive means including a differential pressure responsive transducer and said condition being the output signal of said transducer.
2. The combination defined in claim 1 in which said variable restriction member is a motor operated valve responsive to said output signal.
3. The combination defined in claim 1 in which said first means includes a separate source of energy.
4. The combination defined in claim 3 in which said first means is a servo-means for controlling said separate source of energy.
5. The combination defined in claim 1 in which said motor operated valve has an operating impedance range with a positive finite ratio between the maximum and minimum opening of said valve.
6. The combination defined in claim 1 in which the normal operating range of said pressure differential is over a ratio of at least 10 to 1.
7. The combination defined in claim 1 which further includes
  fluid connections between said transducer and said fluid flow line upstream and downstream of said variable restriction member,
  a separate source of energy for said first means, and
  means for modulating said source to provide said output signal.

8. In combination
a fluid flow line connected to a source of fluid,
a variable impedance member interposed in said flow line and providing a pressure differential in said flow line,
means responsive to said pressure differential providing a condition related to said pressure differential, and
means for controlling said impedance member in a predetermined relation to said condition,
a flow control valve in said fluid flow line,
a controller having set point adjusting means and controlling said control valve, and
an operating connection between said set point adjusting means and said variable impedance member for determining the impedance of said member.

9. The combination defined in claim 8 in which said variable impedance member is a motor operated valve.

10. The combination defined in claim 8 in which said responsive means includes a differential pressure responsive transducer and said condition is the output signal of said transducer.

11. The combination defined in claim 8 in which said responsive means includes a differential pressure responsive transducer having an output signal, and said variable impedance member is a motor operated valve responsive to said output signal.

12. The combination defined in claim 8 in which said first means includes a separate source of energy.

13. The combination defined in claim 12 in which said first means is a servo-means for controlling said separated source of energy.

References Cited

UNITED STATES PATENTS

| | | | |
|---|---|---|---|
| 2,312,201 | 2/1943 | Thompson et al. | 137—84 |
| 2,862,162 | 11/1958 | Baring | 137—486 XR |
| 2,864,399 | 12/1958 | Hartz | 137—486 |
| 3,131,714 | 5/1964 | Elliott et al. | 137—486 XR |
| 3,225,785 | 12/1965 | Goike | 137—486 |
| 3,254,662 | 6/1966 | Wagner | 137—486 XR |

M. CARY NELSON, *Primary Examiner.*

ROBERT J. MILLER, *Assistant Examiner.*

U.S. Cl. X.R.

137—100, 487